United States Patent
Tahara (10) Patent No.: US 9,944,199 B2
(45) Date of Patent: Apr. 17, 2018

(54) ELECTRIC CIRCUIT

(71) Applicant: Nissan Motor Co., Ltd., Kanagawa (JP)

(72) Inventor: Masahiko Tahara, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 15/039,264

(22) PCT Filed: Nov. 27, 2013

(86) PCT No.: PCT/JP2013/081955
§ 371 (c)(1),
(2) Date: May 25, 2016

(87) PCT Pub. No.: WO2015/079522
PCT Pub. Date: Jun. 4, 2015

(65) Prior Publication Data
US 2017/0158082 A1    Jun. 8, 2017

(51) Int. Cl.
*B60L 15/20* (2006.01)
*B60L 3/04* (2006.01)
(Continued)

(52) U.S. Cl.
CPC .......... *B60L 15/2045* (2013.01); *B60L 3/04* (2013.01); *B60L 11/18* (2013.01); *B60R 16/03* (2013.01); *H01M 10/44* (2013.01); *B60L 2260/22* (2013.01)

(58) Field of Classification Search
CPC ................................ Y02T 10/26; B60L 11/14
See application file for complete search history.

(56) References Cited

U.S. PATENT DOCUMENTS 6,229,279 B1   5/2001  Dierker
7,336,002 B2 *  2/2008  Kato ................... F02N 11/0866
                                                          307/10.6
(Continued)

FOREIGN PATENT DOCUMENTS

DE   10 2011 000 490 A1   3/2012
DE   10 2011 056 270 A1   6/2012
(Continued)

OTHER PUBLICATIONS

International Preliminary Report on Patentability issued in corresponding International Application No. PCT/JP2013/081955, dated Jun. 2, 2016 (14 pages).
(Continued)

*Primary Examiner* — Eduardo Colon Santana
*Assistant Examiner* — Charles S Laughlin
(74) *Attorney, Agent, or Firm* — Osha Liang LLP (57) ABSTRACT

An electric circuit used in a vehicle having an idling stop function of automatically stopping and automatically restarting an engine includes an electric generator, a first electricity storage capable of charging and discharging electric power generated by the electric generator, a second electricity storage connected in parallel to the first electricity storage, capable of charging and discharging the generated electric power, and having high durability against repetitive charge and discharge compared to the first electricity storage, an engine restarter, which is connected to the first electricity storage and the second electricity storage, configured to crank the engine at a time of the automatic restart, and a switch, which is connected between the engine restarter and the first electricity storage, configured to block a flow of current between the engine restarter and the first electricity storage. The switch includes at least a semiconductor switch.

9 Claims, 8 Drawing Sheets

(51) Int. Cl.
      *B60L 11/18*     (2006.01)
      *B60R 16/03*     (2006.01)
      *H01M 10/44*     (2006.01)

(56) References Cited

U.S. PATENT DOCUMENTS

| | | | |
|---|---|---|---|
| 2003/0160510 A1 | 8/2003 | Mizutani et al. | |
| 2011/0260544 A1* | 10/2011 | Imai | H02J 7/1423 307/66 |
| 2012/0193913 A1* | 8/2012 | Schweiggart | F02N 11/04 290/31 |

FOREIGN PATENT DOCUMENTS

| | | |
|---|---|---|
| EP | 0 987 146 A2 | 3/2000 |
| JP | H11-324873 A | 11/1999 |
| JP | 2003-254208 A | 9/2003 |
| JP | 2006-152820 A | 6/2006 |
| JP | 2007-327395 A | 12/2007 |
| JP | 2010-246198 A | 10/2010 |
| JP | 2011-234479 A | 11/2011 |
| WO | 2013/136953 A1 | 9/2013 |

OTHER PUBLICATIONS

International Search Report for corresponding International Patent Application No. PCT/JP2013/081955 dated Jan. 14, 2014 (10 pages).

* cited by examiner

ELECTRIC CIRCUIT

BACKGROUND

Technical Field

The present invention relates to an electric circuit including two secondary batteries that differ from each other in durability against repetitive charge and discharge.

Related Art

JP 2011-234479A discloses an electric circuit for a vehicle including a lead-acid battery and a lithium-ion battery. The electric circuit of this document is configured as follows. When restarting an engine from idling stop, a power supply voltage of the vehicle instantaneously drops due to high current that flows through a starter motor; therefore, in order to protect a part of electric loads of the vehicle, a flow of current between the lithium-ion battery and the starter motor is blocked, and electric power is supplied to the starter motor only from the lead-acid battery.

SUMMARY OF INVENTION

With the configuration of JP 2011-234479A, the lead-acid battery is discharged at the time of engine restart, and is charged while driving after the engine restart. However, the lead-acid battery has low durability against repetitive charge and discharge compared to high-performance storage batteries, such as lithium-ion batteries and nickel-hydrogen batteries. Therefore, with the configuration of the above document, in which the lead-acid battery is charged and discharged each time the restart is performed from the idling stop, deterioration is expedited even if a high-performance lead-acid battery dedicated for the idling stop is used.

One or more embodiments of the present invention provides an electric circuit for a vehicle that performs idling stop, the electric circuit including first electricity storage means and second electricity storage means that has high durability against repetitive charge and discharge compared to the first electricity storage means, and being capable of suppressing deterioration of the first electricity storage means. Note that examples of the first electricity storage means include a lead-acid battery, and examples of the second electricity storage means include a lithium-ion battery.

According to one or more embodiments of the present invention, there is provided an electric circuit used in a vehicle having an idling stop function of automatically stopping and automatically restarting an engine, the electric circuit including: an electric generator; first electricity storage means capable of charging and discharging electric power generated by the electric generator; second electricity storage means connected in parallel to the first electricity storage means, capable of charging and discharging the generated electric power, and having high durability against repetitive charge and discharge compared to the first electricity storage means; engine restart means, which is connected to the first electricity storage means and the second electricity storage means, for cranking the engine at a time of the automatic restart; and switching means, which is connected between the engine restart means and the first electricity storage means, for blocking a flow of current between the engine restart means and the first electricity storage means. The switching means comprises at least a semiconductor switch, and at the time of the automatic restart, the switching means blocks the flow of current between the engine restart means and the first electricity storage means, and the engine restart means is driven by the electric power supplied from the second electricity storage means.

According to one or more embodiments of the present invention, the electric power of the non-aqueous electrolyte secondary battery is used in the automatic restart of the engine to drive the engine restart means. This can prevent deterioration of the first electricity storage means caused by execution of the idling stop.

DETAILED DESCRIPTION

The following describes embodiments of the present invention with reference to the attached drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 1:
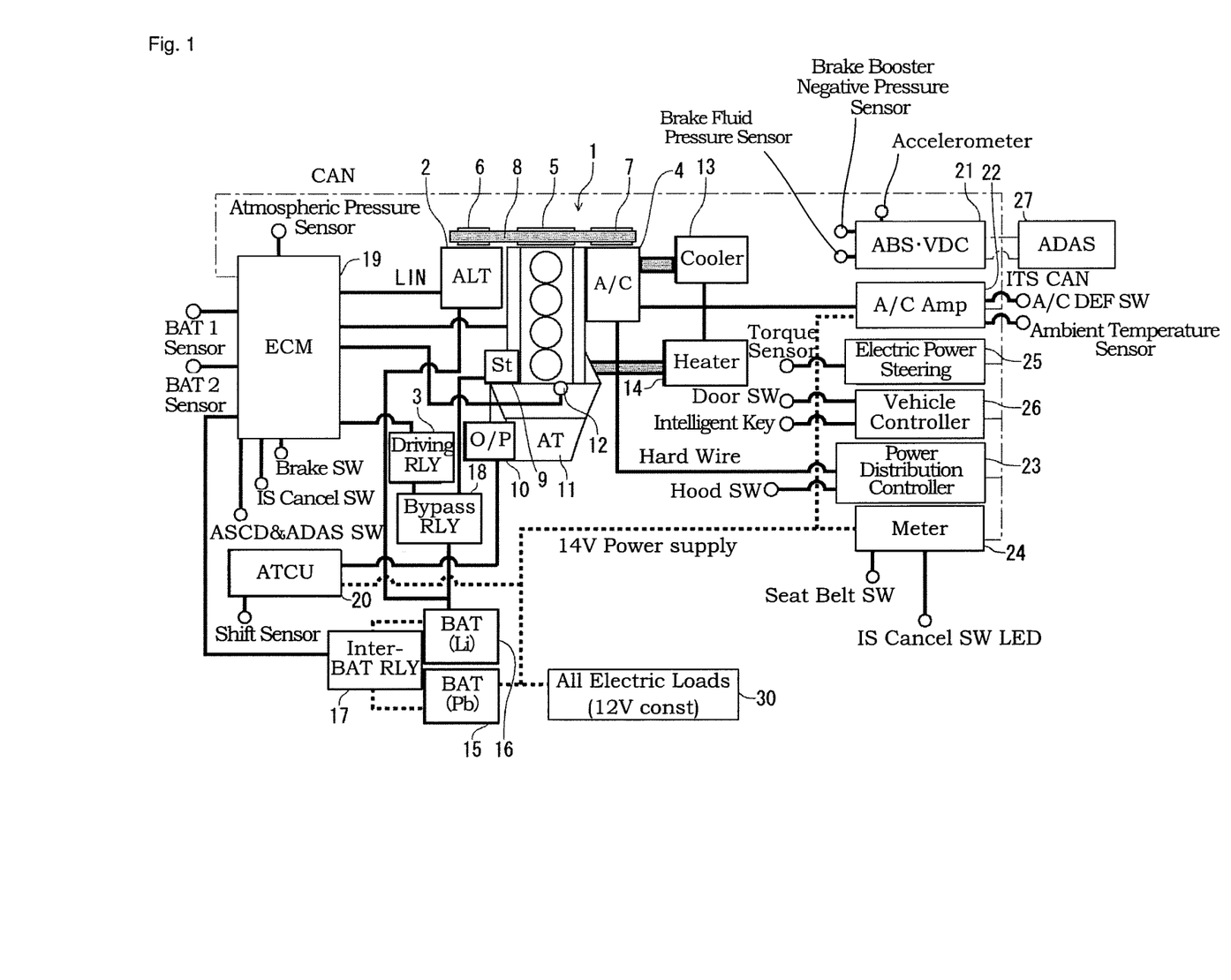
FIG. 1 is a schematic diagram of a system on which one or more embodiments of the present invention is based.

FIG. 1 is a schematic diagram of a system of an engine having an idling stop function. One or more embodiments of the present invention may be based on this system.

As shown in FIG. 1, in an engine 1, an electric generator 2 and an air conditioner compressor 4 are provided respectively at one side and the other side, each via a non-illustrated bracket and the like. A belt 8 is wound across a crank pulley 5 mounted on a front end of a crankshaft of the engine 1, an electric generator pulley 6 mounted on a front end of a rotation shaft of the electric generator 2, and a compressor pulley 7 mounted on a front end of a rotation shaft of the air conditioner compressor 4. Thus, the crank pulley 5, the electric generator pulley 6, and the compressor pulley 7 are mechanically joined to one another.

Although the three pulleys, i.e., the crank pulley 5, the electric generator pulley 6, and the compressor pulley 7 are mechanically joined to one another via one belt 8 in FIG. 1, each of the electric generator pulley 6 and the compressor pulley 7 may be mechanically joined to the crank pulley 5 using a different one of belts 8. The belt(s) may be replaced with a chain(s).

The engine 1 includes a starter 9 located in the vicinity of a junction with an automatic transmission 11. Similarly to an ordinary starter for startup, the starter 9 includes a pinion gear that moves forward and backward. When the starter 9 is actuated, the pinion gear engages with a gear provided on an outer periphery of a drive plate mounted on a rear end of the crankshaft, thereby performing cranking. A supply of electric power to the starter 9 will be described later.

In order to secure a control hydraulic pressure during the idling stop, the automatic transmission 11 includes an electric oil pump 10. The electric oil pump 10 is actuated in response to an instruction from an automatic transmission controller 20, and improves responsiveness at the time of starting from the idling stop.

The electric generator 2 generates electric power while being driven by a driving force of the engine 1. In generating the electric power, a power generation voltage can be variably controlled via LIN communication or a hard wire. The electric generator 2 can also regenerate kinetic energy of the vehicle as electric power during deceleration of the vehicle. Control over such power generation and regeneration is performed by an engine control module (ECM) 19.

The ECM 19 reads in various types of detection signals from a crank angle sensor 12, a battery sensor, an atmospheric pressure sensor, and the like, as well as various types of signals from a brake switch and the like, to control a fuel injection amount, an ignition timing, the idling stop, etc. Furthermore, the ECM 19 performs optimal control for the vehicle through intercommunication with an ABS/VDC unit 21, an air conditioner amplifier 22, an electric power steering unit 25, a vehicle controller 26, a power distribution controller 23, a meter unit 24, and an advanced driver assistance system (ADAS) unit 27 via a controller area network (CAN). Note that the ECM 19 is composed of a microcomputer provided with a central processing unit (CPU), a read-only memory (ROM), a random-access memory (RAM), and an input/output (I/O) interface. The ECM 19 can be composed of a plurality of microcomputers.

The present system includes two secondary batteries: a lead storage battery as first electricity storage means, and a non-aqueous electrolyte secondary battery as second electricity storage means. Hereinafter, the lead storage battery is represented by a lead-acid battery 15, and the non-aqueous electrolyte secondary battery is represented by a lithium-ion battery 16. It will be assumed that an open-circuit voltage of the lead-acid battery 15 in a fully-charged state is 12.7 V, and an open-circuit voltage of the lithium-ion battery 16 in a fully-charged state is 13.1 V.

The lead-acid battery 15 and the lithium-ion battery 16 are connected in parallel, and a later-described inter-battery relay 17 is connected therebetween. The inter-battery relay 17 is controlled by the ECM 19.

The starter 9 is connected to the lithium-ion battery 16 via a bypass relay 18. The ECM 19 controls the bypass relay 18 via a driving relay 3. The bypass relay 18 is of a normally closed type.

The lead-acid battery 15 supplies electric power to all electric loads 30. The inter-battery relay 17 is switched off to prevent the influence of a momentary voltage drop (hereinafter also referred to as a voltage sag) caused by driving the starter 9 at the time of automatic engine restart from the idling stop. Consequently, voltage for actuating all electric loads 30 is guaranteed.

Both of the lead-acid battery 15 and the lithium-ion battery 16 are charged with the electric power generated by the electric generator 2 (including regenerated electric power, the same goes for the following description).

Note that voltage adjustment is made through field current control by the electric generator 2 when supplying electric power from the lead-acid battery 15 and the lithium-ion battery 16 to all electric loads 30, and when charging the lead-acid battery 15 or the lithium-ion battery 16 with the electric power generated by the electric generator 2.

A description is now given of the automatic engine restart from the idling stop. Idling stop control according to one or more embodiments is similar to ordinary idling stop control. For example, the engine 1 is automatically stopped when certain conditions are satisfied, e.g., when an accelerator pedal is fully closed, when a brake pedal is in a depressed state, and when a vehicle speed is equal to or lower than a predetermined vehicle speed, whereas the engine 1 is automatically restarted when, for example, a depression amount of the brake pedal is equal to or smaller than a predetermined amount.

Figure 2:
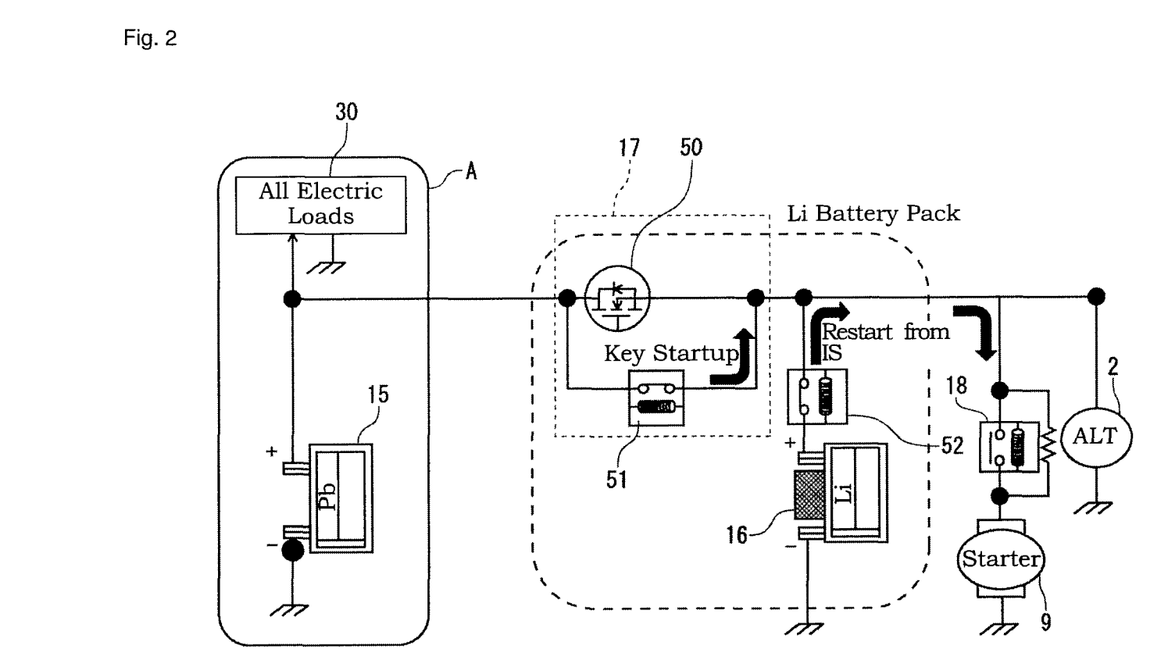
FIG. 2 is an electric circuit diagram according to a first embodiment.

FIG. 2 is an electric circuit diagram of a portion related to the automatic engine restart in the system shown in FIG. 1.

As shown in FIG. 2, the lead-acid battery 15 and the lithium-ion battery 16 are connected in parallel, and the inter-battery relay 17 is connected therebetween. The inter-battery relay 17 is composed of a MOSFET 50 that serves as a semiconductor switch, and a first relay 51 that is connected in parallel to the MOSFET 50. A second relay 52 is connected between the lithium-ion battery 16 and the inter-battery relay 17.

The MOSFET 50 is connected in such a manner that the forward direction of a parasitic diode thereof matches the direction from the lithium-ion battery 16 toward the lead-acid battery 15. The first relay 51 is of a so-called normally closed type, and is in a closed state when current does not flow through a coil thereof. The second relay 52 is of a so-called normally open type, and is in an open state when current does not flow through a coil thereof. Here, an open state denotes a state where current is blocked from flowing, whereas a closed state denotes a state where current is flowing.

Note that in an actual product, the lithium-ion battery 16, the first relay 51, the second relay 52, and the MOSFET 50 are assembled into a single item and treated as a lithium battery pack.

All electric loads 30 are connected to be on the same side as the lead-acid battery 15 relative to the inter-battery relay 17. The starter 9 and the electric generator 2 are connected to be on the same side as the lithium-ion battery 16 relative to the inter-battery relay 17.

In the first embodiment, it will be assumed that the instantaneous maximum current-carrying capacity of the MOSFET 50 is 180 A, the instantaneous maximum current-carrying capacity of the first relay 51 is 1200 A, the instantaneous maximum current-carrying capacity of the second relay 52 is 800 A, and the instantaneous maximum current-carrying capacity of the bypass relay 18 is 1200 A.

In the above-described electric circuit, while the vehicle is running, the ECM 19 places the first relay 51 in the closed state, and the ECM 19 or a non-illustrated lithium ion battery controller places the second relay 52 and the MOSFET 50 in the closed state and the open state, respectively. Consequently, the lead-acid battery 15 and the lithium-ion battery 16 can be charged with the electric power generated by the electric generator 2. However, the properties of the lithium-ion battery 16 and the lead-acid battery 15 are such that the lithium-ion battery 16 is more likely to be charged with the electric power generated by the electric generator 2 than the lead-acid battery 15 is, and the lead-acid battery 15 in the fully-charged state is hardly charged when a charging voltage exceeds 13 V. Therefore, mainly the lithium-ion battery 16 is charged with the electric power generated by the electric generator 2.

After the automatic stop through the idling stop control (hereinafter also referred to as during the idling stop), the ECM 19 first places the MOSFET 50 in the closed state and then places the first relay 51 in the open state, the ECM 19 or the non-illustrated lithium ion battery controller places the second relay 52 in the closed state, and the ECM 19 places the bypass relay 18 in the open state. Even if the first relay 51 is in the open state, a flow of current between the lithium-ion battery 16 and all electric loads 30 is secured via the MOSFET 50. Thus, during the idling stop, electric power can be supplied to all electric loads 30 from either of the lead-acid battery 15 and the lithium-ion battery 16.

When the electric generator 2 is out of control and a power generation voltage becomes excessively high, the ECM 19 or the non-illustrated lithium ion battery controller places the second relay 52 in the open state. In this way, the lithium-ion battery 16 is prevented from being subjected to an overvoltage.

In view of the properties of the lithium-ion battery 16 and the lead-acid battery 15, electric power is supplied to all electric loads 30 mainly from the lithium-ion battery 16. Due to such properties, in particular the aforementioned property that the lithium-ion battery 16 is more likely to be charged with the generated electric power, the voltage of the lithium-ion battery 16 is maintained to be equivalent to or higher than the voltage of the lead-acid battery 15, except at the time of later-described automatic restart where the starter 9 is driven by the electric power of the lithium-ion battery 16.

Incidentally, one of the features of the lithium-ion battery 16 is that it has a high energy density and a high charge-discharge energy efficiency compared to the lead-acid battery 15. Another feature of the lithium-ion battery 16 is that it is expected to have a long life because dissolution and deposition of electrode materials do not occur along with charge and discharge. On the other hand, the lead-acid battery 15, although low-cost compared to the lithium-ion battery 16 for the same capacity, is subjected to electrode deterioration along with discharge, and hence inferior to the lithium-ion battery 16 in terms of durability against repetitive charge and discharge.

In view of the above, at the time of engine restart from the idling stop, the first embodiment places the first relay 51 in the open state, places the second relay 52 in the closed state, and places the MOSFET 50 in the open state to prevent a voltage drop in all electric loads 30. That is to say, the MOSFET 50 is opened during the idling stop. Then, electric power is supplied to the starter 9 only from the lithium-ion battery 16. Then, 100-150 ms after the starter 9 is driven, the bypass relay 18 is switched from the open state to the closed state, thereby securing a startup performance while significantly reducing the current spikes at the time of starting the starter 9. When a certain time period has elapsed since completion of the engine starting operation, control for returning to normal run is performed.

On the other hand, when starting the engine 1 in response to a startup manipulation performed by a driver, such as a key manipulation and a start button manipulation (hereinafter also referred to as an initial startup), electric power is supplied to the starter 9 only from the lead-acid battery 15 while the first relay 51 is in the closed state, the second relay 52 is in the open state, and the MOSFET 50 is in the open state.

Note that at the time of initial startup, electric power may be supplied to the starter 9 from the two batteries, i.e., the lead-acid battery 15 and the lithium ion battery 16, by placing the second relay 52 in the closed state.

A description is now given of the operational effects of the electric circuit configured in the above-described manner.

If the electric power of the lead-acid battery 15 is used in the automatic restart of the engine 1, deterioration of the lead-acid battery 15 is expedited each time the idling stop is performed because, as stated before, the lead-acid battery 15 has low durability against repetitive charge and discharge compared to the lithium-ion battery 16. As a result, a replacement cycle of the lead-acid battery 15 is shortened. In contrast, in the first embodiment, at the time of automatic restart of the engine 1, a path for supplying electric power from the lead-acid battery 15 to the starter 9 is blocked, and the automatic restart is performed using the electric power of the lithium-ion battery 16. This can extend the replacement cycle of the lead-acid battery 15.

Although the inter-battery relay 17 is composed of the MOSFET 50 and the first relay 51 in FIG. 2, the path for supplying electric power from the lead-acid battery 15 to the starter 9 can also be blocked using only the MOSFET 50, using only the first relay 51, or using another switch. However, if only the MOSFET 50 is used, heat is generated because the MOSFET 50 is continuously driven. Such heat generation triggers adverse effects. If only the first relay 51 is used, due to poor responsiveness of a relay switch, placing the first relay 51 in the open state after the conditions for the automatic restart are satisfied requires time until the automatic restart, whereas placing the first relay 51 in the open state during the idling stop disables a supply of electric power from the lithium-ion battery 16 during the idling stop. Furthermore, a redundant circuit is desirable to further improve marketability. In view of the above, the MOSFET 50 and the first relay 51 are included as stated before. During the idling stop, the first relay 51 is placed in the open state, and the MOSFET 50 is placed in the closed state. At the time of automatic restart, the MOSFET 50 with excellent responsiveness is switched from the closed state to the open state. In this way, the automatic restart can be performed promptly without causing a voltage drop in all electric loads 30.

In the electric circuit according to the first embodiment, except at the time of automatic restart, the voltage of the lithium-ion battery 16 is equivalent to or higher than the voltage of the lead-acid battery 15, and thus the flow of current from the lead-acid battery 15 side to the lithium-ion battery 16 side can be prevented by placing the first relay 51 and the MOSFET 50 in the open state. That is to say, the flow of current from the lead-acid battery 15 side to the lithium-ion battery 16 side can be prevented without installing a MOSFET in which the forward direction of a parasitic diode is opposite to that in the MOSFET 50. This can suppress the cost incurred by installing such a MOSFET.

In the electric circuit according to the first embodiment, a portion where the lead-acid battery 15 and all electric loads 30 are connected (a portion enclosed by frame A in FIG. 2) is configured in a manner similar to an ordinary electric circuit for a vehicle including only one battery. Furthermore, as the lead-acid battery 15 is not used in the automatic restart, there is no need to increase the capacity of the lead-acid battery 15 compared to that in a vehicle without the idling stop function, and the specifications of the lead-acid battery 15 can be the same as those for a vehicle without the idling stop function. This allows for a reduction in the cost of an idling stop system.

According to the first embodiment, even if electric power cannot be supplied from the lithium-ion battery 16 to the starter 9 due to, for example, disconnection of a negative terminal of the lithium-ion battery 16, the automatic restart can be performed as electric power can be supplied from the lead-acid battery 15 to the starter 9 by closing the first relay 51.

Second Embodiment

Figure 3:
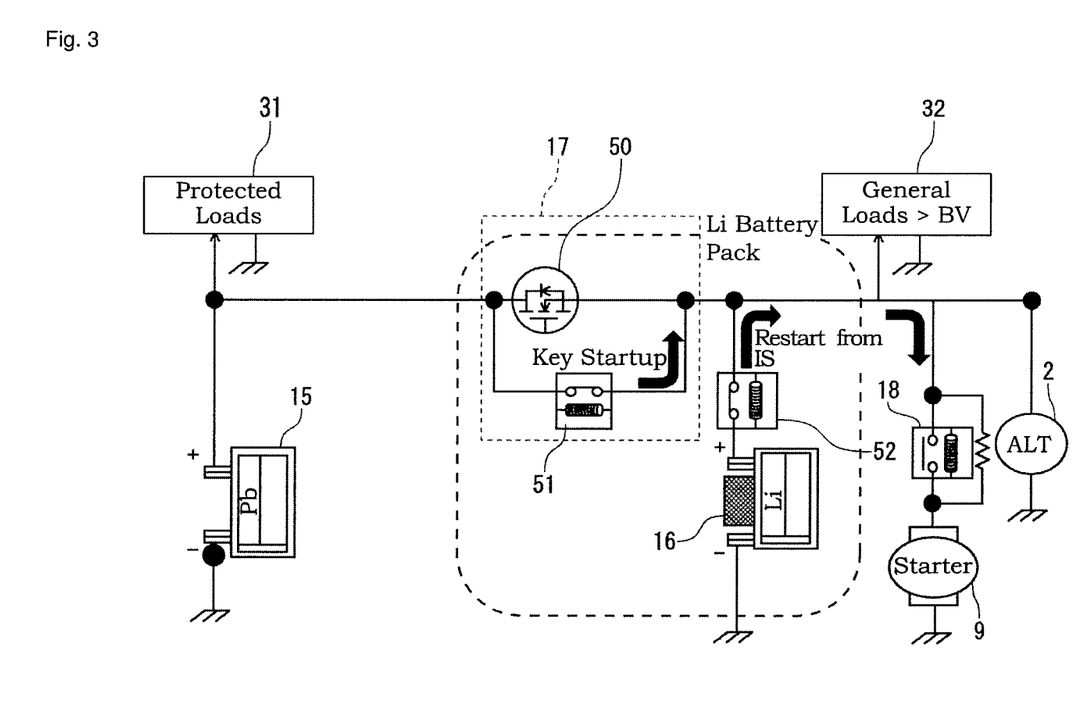
FIG. 3 is an electric circuit diagram according to a second embodiment.

FIG. 3 is an electric circuit diagram according to a second embodiment of the present invention. FIG. 3 differs from FIG. 2 in that the loads are categorized into a first electric load group 31 and a second electric load group 32, and that the second electric load group 32 is connected to be on the same side as the lithium-ion battery 16 relative to the inter-battery relay 17. The first electric load group 31 is a group of electric components that cannot tolerate a voltage sag at the time of automatic engine restart by the idling stop function. Examples of such electric components include a navigation system and an audio system. The second electric load group 32 is a group of electric components that can tolerate voltage sag. Examples of such electric components include wipers, headlights, and airbags.

Despite the foregoing configuration differences, control for opening/closing the MOSFET 50, the first relay 51, the second relay 52, and the bypass relay 18 is similar to that of the first embodiment.

Therefore, according to the second embodiment, the automatic restart of the engine 1 from the idling stop is performed using the electric power of the lithium-ion battery 16. This can prevent deterioration of the lead-acid battery 15 caused by execution of the idling stop.

Furthermore, according to the second embodiment, the electric loads are categorized into the first electric load group 31 and the second electric load group 32. This increases a degree of freedom in the in-vehicle layout compared to a configuration in which all electric loads are integrated into one group.

Third Embodiment

Figure 4:
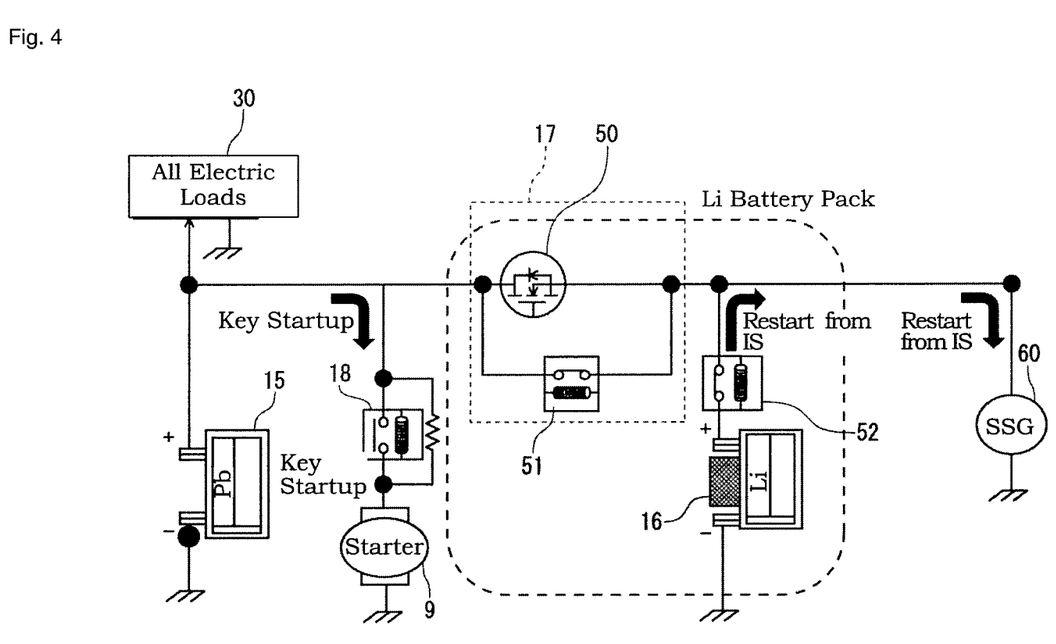
FIG. 4 is an electric circuit diagram according to a third embodiment.

FIG. 4 is an electric circuit diagram according to a third embodiment of the present invention. FIG. 4 differs from FIG. 2 in that an electric motor 60 is used in place of the electric generator 2, and that the starter 9 is connected to be on the same side as the lead-acid battery 15 relative to the inter-battery relay 17. The electric motor 60 includes a pulley that is equivalent to the electric generator pulley 6. This pulley is mechanically joined to the crank pulley 5 via a belt or the like.

The electric motor 60 includes an inverter, and has a motor function that is driven by the electric power supplied from the lithium-ion battery 16, as well as a power generation function of generating electric power while being driven by a driving force of the engine 1. In using the power generation function of the electric motor 60, a power generation voltage can be variably controlled.

Switching between the motor function and the power generation function is performed by the ECM 19. The motor function is used mainly at the time of automatic restart from the idling stop. That is to say, in the third embodiment, the electric motor 60 serves as engine restart means.

Control for opening/closing the MOSFET 50, the first relay 51, the second relay 52, and the bypass relay 18 is similar to that of the first embodiment. That is to say, the automatic restart from the idling stop is performed through cranking of the engine 1 by the electric motor 60 that has received a supply of electric power from the lithium-ion battery 16. The starter 9 is used only at the time of initial startup.

According to the third embodiment, similarly to the first embodiment, deterioration of the lead-acid battery 15 caused by execution of the idling stop can be prevented, and the specifications of the starter 9 can be the same as those for a vehicle without the idling stop function.

Furthermore, according to the third embodiment, the lead-acid battery 15 and the starter 9 are located on the same side relative to the inter-battery relay 17. Therefore, when supplying electric power from the lead-acid battery 15 to the starter 9 at the time of initial startup, current does not flow through the first relay 51. That is to say, in setting the instantaneous maximum current-carrying capacity of the first relay 51, there is no need to take into consideration the flow of high current for driving the starter 9 at the time of initial startup. Accordingly, the current-carrying capacity of the first relay 51, which is 1200 A in the first embodiment, can be reduced to approximately 800 A. This allows for a reduction in the cost of the first relay 51.

Fourth Embodiment

Figure 5:
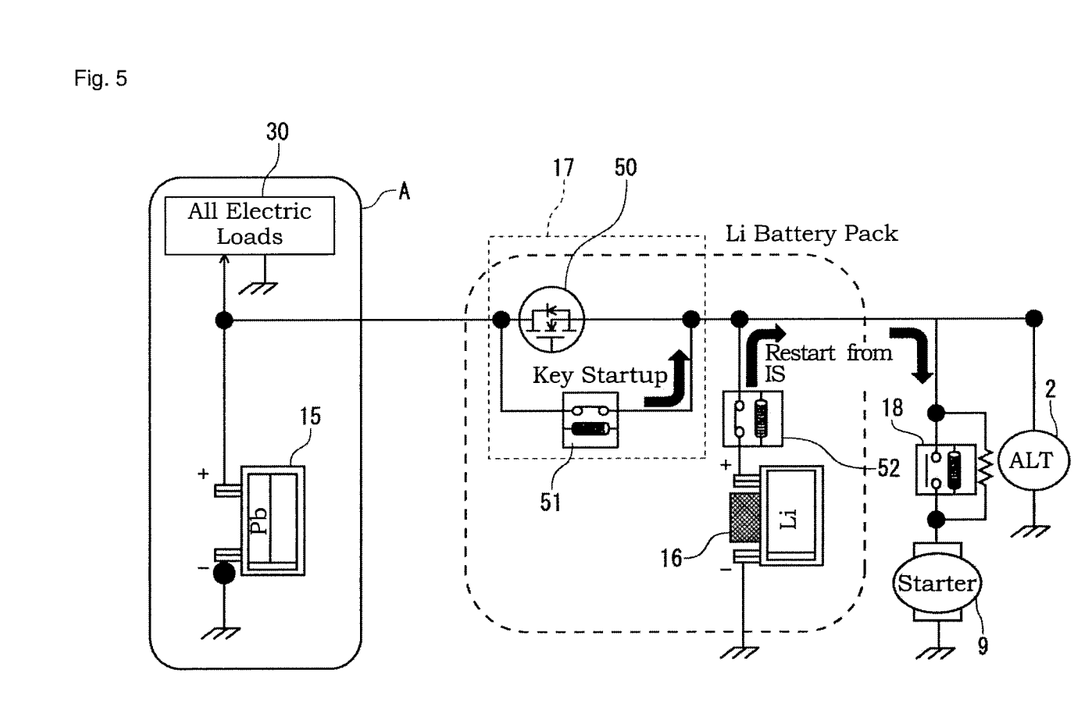
FIG. 5 is an electric circuit diagram according to a fourth embodiment.

FIG. 5 is an electric circuit diagram according to a fourth embodiment of the present invention. FIG. 5 differs from FIG. 2 in that the first relay 51 is of a normally open type.

The open/closed states of the MOSFET 50, the first relay 51, the second relay 52, and the bypass relay 18 while the vehicle is running and during the idling stop are similar to those of the first embodiment. As opposed to the normally closed type first relay 51 according to the first embodiment, the first relay 51 according to the fourth embodiment is of a normally open type. Therefore, in the fourth embodiment, control for flowing current through the coil of the first relay 51 is the reverse of that of the first embodiment.

Similarly to the first embodiment, the fourth embodiment can achieve the effects of prevention of deterioration of the lead-acid battery 15 caused by execution of the idling stop, and a reduction in the cost of the idling stop system.

Furthermore, a sensor that detects a voltage at the lead-acid battery 15 side relative to the inter-battery relay 17 may be provided, and the ECM 19 may not actuate the first relay 51 when the detected voltage is excessively high. As the first relay 51 is of a normally open type, this configuration restricts the engine startup in a state where an overvoltage is applied, e.g., at the time of so-called jump start where a startup manipulation is performed with the use of the lead-acid battery 15 and another lead-acid battery 15 that are connected in series. In this way, the starter 9 can be protected from the overvoltage.

Fifth Embodiment

Figure 6:
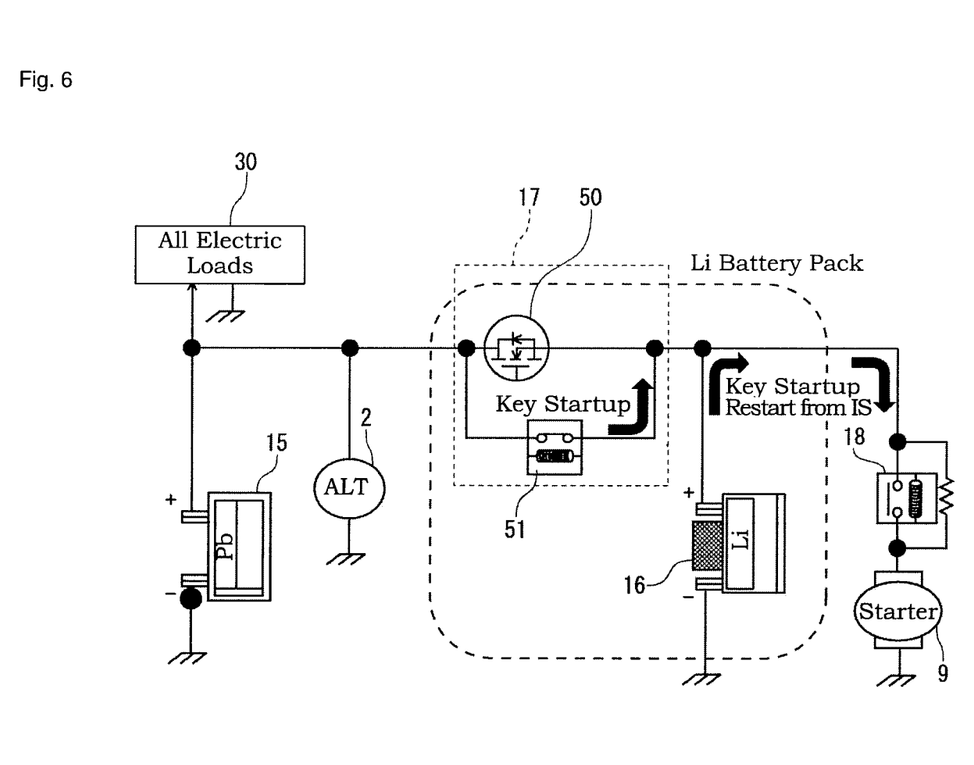
FIG. 6 is an electric circuit diagram according to a fifth embodiment.

FIG. 6 is an electric circuit diagram according to a fifth embodiment of the present invention. FIG. 6 differs from FIG. 2 in that the first relay 51 is of a normally open type, that the second relay 52 is not provided, and that the electric generator 2 is connected to be on the same side as the lead-acid battery 15 relative to the inter-battery relay 17.

The open/closed states of the MOSFET 50, the first relay 51, and the bypass relay 18 while the vehicle is running and during the idling stop are similar to those of the first embodiment. As opposed to the normally closed type first relay 51 according to the first embodiment, the first relay 51 according to the fifth embodiment is of a normally open type. Therefore, in the fifth embodiment, control for flowing current through the coil of the first relay 51 is the reverse of that of the first embodiment.

Similarly to the first embodiment, the fifth embodiment can achieve the effects of prevention of deterioration of the lead-acid battery 15 caused by execution of the idling stop, and a reduction in the cost of the idling stop system.

It is known that the lithium-ion battery 16 has low durability against an overvoltage compared to the lead-acid battery 15. In one or more of the above-described embodiments, the lithium-ion battery 16 is prevented from being subjected to the overvoltage by opening the second relay 52. In contrast, the fifth embodiment, in which the second relay 52 is not provided, can protect the lithium-ion battery 16 from the overvoltage by preventing the actuation of the first relay 51 upon detection of the overvoltage in a manner similar to the fourth embodiment. This configuration can also protect the starter 9 from a jump start in a manner similar to the fourth embodiment.

Sixth Embodiment

Figure 7:
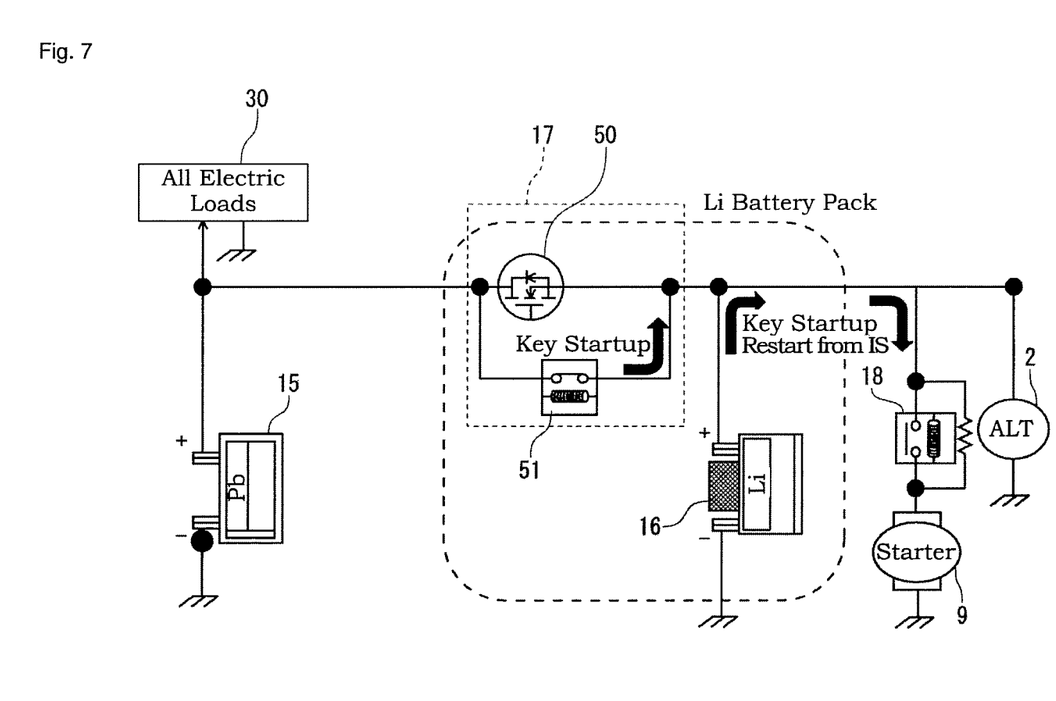
FIG. 7 is an electric circuit diagram according to a sixth embodiment.

FIG. 7 is an electric circuit diagram according to a sixth embodiment of the present invention. The configuration of the present embodiment is similar to the configuration of the fifth embodiment, except that the electric generator 2 is connected to be on the same side as the lithium-ion battery 16 relative to the inter-battery relay 17.

With the configuration of the sixth embodiment, a relay and the like do not exist between the electric generator 2 and the lithium-ion battery 16. Therefore, in the path from the electric generator 2 to the lithium-ion battery 16, a voltage drop is small compared to the configurations of one or more of the above-described embodiments. That is to say, the efficiency of regeneration during deceleration of the vehicle is improved compared to the configurations of one or more of the above-described embodiments.

Furthermore, with the configuration of the sixth embodiment, electric power is supplied to the starter 9 from the lead-acid battery 15 and the lithium-ion battery 16 at the time of initial startup. This allows for a reduction in the current-carrying capacity of the first relay 51 and the capacity of the lithium-ion battery 16, as well as a reduction in the cost. For example, the current-carrying capacity of the first relay 51, which is 1200 A in the first embodiment, can be reduced to approximately 800 A.

Seventh Embodiment

Figure 8:
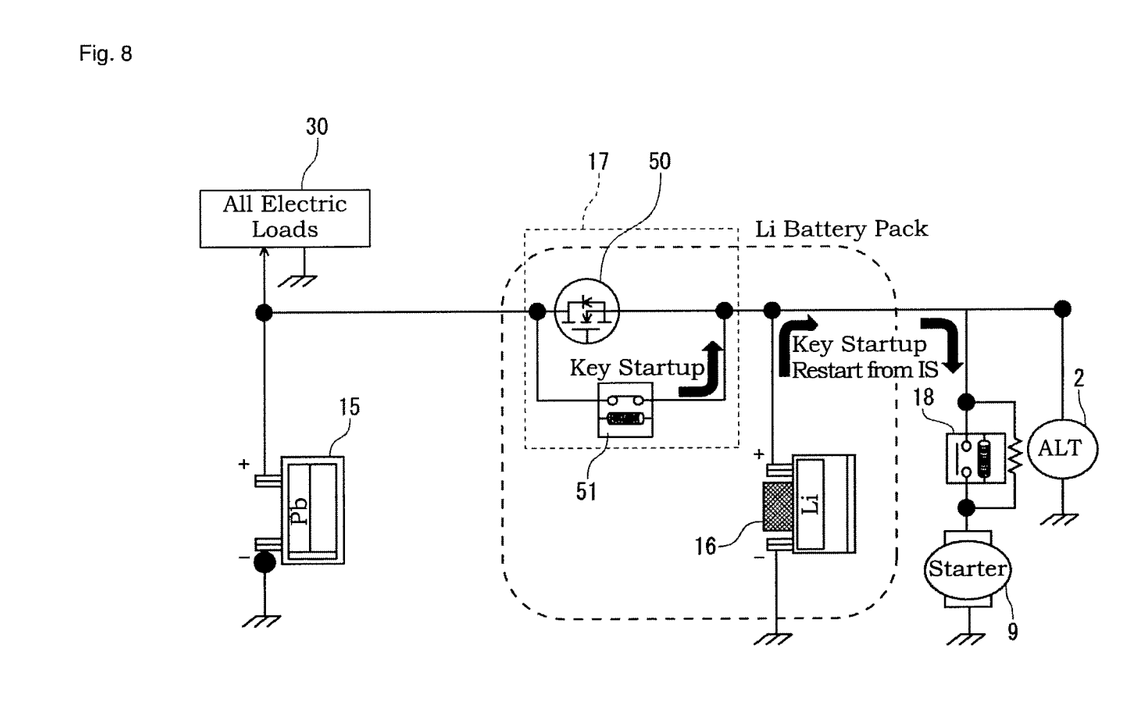
FIG. 8 is an electric circuit diagram according to a seventh embodiment.

FIG. 8 is an electric circuit diagram according to a seventh embodiment of the present invention. The configuration of the seventh embodiment is similar to the configuration of the sixth embodiment, except that the first relay 51 is of a normally closed type.

With the configuration of the present embodiment, as the first relay 51 is of a normally closed type, the initial startup can be performed as long as the first relay 51 is not fixed in the open state.

Note that in one or more of the above embodiments, the lead-acid battery 15 is used at the time of initial startup, whereas the lithium-ion battery 16 is used at the time of automatic restart. This is because, with the use of the lead-acid battery 15 that has a better low-temperature startup performance than the lithium-ion battery 16, a startup performance is secured when the battery temperatures are low, e.g., at the time of initial startup following long hours parked at sub-zero temperatures. On the other hand, at the time of automatic restart from the idling stop, the lithium-ion battery 16 that has a better charge-discharge characteristic than the lead-acid battery 15 is used because the battery temperatures have already risen through driving until the idling stop.

Therefore, at the time of initial startup, a determination may be made as to whether the temperature of the lithium-ion battery 16 has decreased to the point where the startup performance is degraded. If it is determined that the temperature of the lithium-ion battery 16 has not decreased to the point where the startup performance is degraded, the lithium-ion battery 16 may also be used in the initial startup. This configuration can further suppress deterioration of the lead-acid battery 15.

Embodiments of this invention were described above, but the above embodiments are merely exemplary, and the technical scope of the invention is not limited to the specific constitutions of the above embodiments. For example, the first electricity storage means is not limited to the lead-acid battery 15, and may be, for example, a lead-free secondary battery, such as a nickel-hydrogen battery. Furthermore, the mechanical relays used in one or more of the above embodiments may be replaced with switching elements with semiconductors.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An electric circuit used in a vehicle having an idling stop function of automatically stopping and automatically restarting an engine, the electric circuit comprising:
   an electric generator;
   a lead battery capable of charging and discharging electric power generated by the electric generator;
   a non-aqueous electrolyte secondary battery connected in parallel to the lead battery, capable of charging and discharging the generated electric power, and having high durability against repetitive charge and discharge compared to the lead battery;
   an engine restarter, which is connected to the lead battery and the non-aqueous electrolyte secondary battery, configured to crank the engine at a time of the automatic restart; and
   a switch, which is connected between the engine restarter and the lead battery, configured to block a flow of current between the engine restarter and the lead battery,
   wherein the switch comprises at least a semiconductor switch,
   wherein at the time of the automatic restart, the switch blocks the flow of current between the engine restarter and the lead battery, and the engine restarter is driven by the electric power supplied from the non-aqueous electrolyte secondary battery,
   wherein the semiconductor switch includes a parasitic diode, and is connected such that a forward direction of the parasitic diode matches a direction from the non-aqueous electrolyte secondary battery toward the lead battery,
   wherein the switch comprises a first relay in addition to the semiconductor switch,
   wherein the first relay is connected in parallel to the semiconductor switch, and
   wherein the semiconductor switch is closed and the first relay is opened when the engine has been automatically stopped, and the semiconductor switch is opened at the time of the automatic restart.

2. An electric circuit used in a vehicle having an idling stop function of automatically stopping and automatically restarting an engine, the electric circuit comprising:
an electric generator;
a first electricity storage capable of charging and discharging electric power generated by the electric generator;
a second electricity storage connected in parallel to the first electricity storage, capable of charging and discharging the generated electric power, and having high durability against repetitive charge and discharge compared to the first electricity storage;
an engine restarter, which is connected to the first electricity storage and the second electricity storage, configured to crank the engine at a time of the automatic restart; and
a switch, which is connected between the engine restarter and the first electricity storage, configured to block a flow of current between the engine restarter and the first electricity storage,
wherein the switch comprises at least a semiconductor switch,
wherein at the time of the automatic restart, the switch blocks the flow of current between the engine restarter and the first electricity storage, and the engine restarter is driven by the electric power supplied from the second electricity storage,
wherein the semiconductor switch includes a parasitic diode, and is connected such that a forward direction of the parasitic diode matches a direction from the second electricity storage toward the first electricity storage,
wherein the switch comprises a first relay in addition to the semiconductor switch,
wherein the first relay is connected in parallel to the semiconductor switch,
wherein the semiconductor switch is closed and the first relay is opened when the engine has been automatically stopped, and the semiconductor switch is opened at the time of the automatic restart,
wherein electric loads of the vehicle are connected to be on the same side as the first electricity storage relative to the switch,
wherein the electric generator is connected to be on the same side as the second electricity storage relative to the switch,
wherein a second relay is connected between the second electricity storage and the engine restarter, and the second relay is capable of blocking a flow of current between the engine restarter and the second electricity storage,
wherein the first relay is of a normally closed type, and is in a closed state when current is blocked from flowing through a coil thereof, and
wherein the second relay is of a normally open type, and is in an open state when current is blocked from flowing through a coil thereof.

3. The electric circuit according to claim 2,
wherein the electric loads are categorized into a first load group and a second load group, the first load group and the second load group are respectively capable of and incapable of tolerating actuation under a voltage sag at the time of the automatic restart, the first load group is connected to be on the same side as the second electricity storage relative to the switch, and the second load group is connected to be on the same side as the first electricity storage relative to the switch.

4. The electric circuit according to claim 1,
wherein the engine restarter is realized by the electric generator provided with a function as a driving motor, and connected to be on the same side as the non-aqueous electrolyte secondary battery relative to the switch,
wherein a starter motor and electric loads of the vehicle are connected to be on the same side as the lead battery relative to the switch, and the starter motor cranks the engine when the engine is started by a startup manipulation performed by a driver,
wherein a second relay is connected between the non-aqueous electrolyte secondary battery and the engine restarter, and the second relay is capable of blocking a flow of current between the engine restarter and the non-aqueous electrolyte secondary battery,
wherein the first relay is of a normally closed type, and is in a closed state when current is blocked from flowing through a coil thereof, and
wherein the second relay is of a normally open type, and is in an open state when current is blocked from flowing through a coil thereof.

5. The electric circuit according to claim 1,
wherein electric loads of the vehicle are connected to be on the same side as the lead battery relative to the switch,
wherein the electric generator is connected to be on the same side as the non-aqueous electrolyte secondary battery relative to the switch,
wherein a second relay is connected between the non-aqueous electrolyte secondary battery and the engine restarter, and the second relay is capable of blocking a flow of current between the engine restarter and the non-aqueous electrolyte secondary battery,
wherein the first relay is of a normally open type, and is in an open state when current is blocked from flowing through a coil thereof, and
wherein the second relay is of a normally open type, and is in an open state when current is blocked from flowing through a coil thereof.

6. The electric circuit according to claim 1,
wherein electric loads of the vehicle are connected to be on the same side as the lead battery relative to the switch,
wherein the electric generator is connected to be on the same side as the non-aqueous electrolyte secondary battery relative to the switch,
wherein the non-aqueous electrolyte secondary battery and the electric generator are directly connected without any relay mediating therebetween, and
wherein the first relay is of a normally closed type, and is in a closed state when current is blocked from flowing through a coil thereof.

7. The electric circuit according to claim 1,
wherein electric loads of the vehicle are connected to be on the same side as the lead battery relative to the switch,
wherein the electric generator is connected to be on the same side as the lead battery relative to the switch,
wherein the non-aqueous electrolyte secondary battery and the switch are directly connected without any relay mediating therebetween, and
wherein the first relay is of a normally open type, and is in an open state when current is blocked from flowing through a coil thereof.

8. The electric circuit according to claim 1,
wherein electric loads of the vehicle are connected to be on the same side as the lead battery relative to the switch,
wherein the electric generator is connected to be on the same side as the non-aqueous electrolyte secondary battery relative to the switch,
wherein the non-aqueous electrolyte secondary battery and the electric generator are directly connected without any relay mediating therebetween, and
wherein the first relay is of a normally open type, and is in an open state when current is blocked from flowing through a coil thereof.

9. An electric circuit used in a vehicle having an idling stop function of automatically stopping and automatically restarting an engine, the electric circuit comprising:
an electric generator;
a lead battery capable of charging and discharging electric power generated by the electric generator;
a non-aqueous electrolyte secondary battery connected in parallel to the lead battery, capable of charging and discharging the generated electric power, and having high durability against repetitive charge and discharge compared to the lead battery;
engine restart means, which is connected to the lead battery and the non-aqueous electrolyte secondary battery, for cranking the engine at a time of the automatic restart; and
switching means, which is connected between the engine restart means and the lead battery, for blocking a flow of current between the engine restart means and the lead battery,
wherein the switching means comprises at least a semiconductor switch,
wherein at the time of the automatic restart, the switching means blocks the flow of current between the engine restart means and the lead battery, and the engine restart means is driven by the electric power supplied from the non-aqueous electrolyte secondary battery,
wherein the semiconductor switch includes a parasitic diode, and is connected in such a manner that a forward direction of the parasitic diode matches a direction from the non-aqueous electrolyte secondary battery toward the lead battery,
wherein the switching means comprises a first relay in addition to the semiconductor switch, and the first relay is connected in parallel to the semiconductor switch, and
wherein the semiconductor switch is closed and the first relay is opened when the engine has been automatically stopped, and the semiconductor switch is opened at the time of the automatic restart.

* * * * *